(12) United States Patent
Kielaite-Gulla et al.

(10) Patent No.: US 12,272,057 B2
(45) Date of Patent: Apr. 8, 2025

(54) SYSTEM FOR VISUAL DATA ANALYSIS OF ULTRASOUND EXAMINATIONS WITH AND WITHOUT A CONTRAST MEDIUM, FOR EARLY AUTOMATED DIAGNOSTICS OF PANCREATIC PATHOLOGIES

(71) Applicants: Vilnius University, Vilnius (LT); Kaunas University of Technology, Vilnius (LT)

(72) Inventors: Aiste Kielaite-Gulla, Vilnius (LT); Renaldas Raisutis, Kaunas (LT); Kestutis Strupas, Vilnius (LT); Arturas Samuilis, Vilnius (LT)

(73) Assignees: Vilnius University, Vilnius (LT); Kaunas University of Technology, Kaunas (LT)

( * ) Notice: Subject to any disclaimer, the term of this patent is extended or adjusted under 35 U.S.C. 154(b) by 144 days.

(21) Appl. No.: 18/016,461

(22) PCT Filed: Jul. 16, 2021

(86) PCT No.: PCT/IB2021/056443
§ 371 (c)(1),
(2) Date: Jan. 17, 2023

(87) PCT Pub. No.: WO2022/013832
PCT Pub. Date: Jan. 20, 2022

(65) Prior Publication Data
US 2023/0281803 A1    Sep. 7, 2023

(30) Foreign Application Priority Data
Jul. 17, 2020  (LT) .................................... 2020 538

(51) Int. Cl.
*G06T 7/00*    (2017.01)

(52) U.S. Cl.
CPC .. *G06T 7/0012* (2013.01); *G06T 2207/10132* (2013.01); *G06T 2207/20081* (2013.01)

(58) Field of Classification Search
CPC ......... G06T 7/0012; G06T 2207/10132; G06T 2207/20081
See application file for complete search history.

(56) References Cited

U.S. PATENT DOCUMENTS

| | | | |
|---|---|---|---|
| 8,831,311 B2 | 9/2014 | Swamy et al. | |
| 10,614,573 B2 | 4/2020 | Lin et al. | |

(Continued)

FOREIGN PATENT DOCUMENTS

| | | |
|---|---|---|
| RU | 2622611 | 6/2017 |
| RU | 2649528 | 4/2018 |

OTHER PUBLICATIONS

International Search Report and Written Opinion mailed Jan. 14, 2022 for PCT Application No. PCT/IB2021/056443.

(Continued)

*Primary Examiner* — Sean A Frith
(74) *Attorney, Agent, or Firm* — Koivula & Somersalo, LLC

(57) ABSTRACT

We present a system and method for analysis of image and data of ultrasound and ultrasound with contrast medium of human pancreatic tissues to automatically diagnose acute pancreatitis of the pancreas and identify pancreatic non-viable tissues at an early stage. The system consists of a diagnostic ultrasound system with specialized software for contrast studies (ultrasound) for in vivo ultrasound examinations of human internal organs, recording reflected ultrasound signals from pancreatic tissues (without contrast material and when contrast material is injected) and an image and data processing algorithm with artificial intelli- (Continued)

gence (neural network) elements providing a diagnostic estimate of a recommendatory nature.

11 Claims, 2 Drawing Sheets

(56) References Cited

U.S. PATENT DOCUMENTS

| | | | |
|---|---|---|---|
| 11,064,902 | B2 | 7/2021 | Wallace et al. |
| 11,132,797 | B2 | 9/2021 | Mao et al. |
| 2015/0201907 | A1 | 7/2015 | Stergiopoulos et al. |
| 2018/0279985 | A1 | 10/2018 | Martinez-Lorenzo et al. |
| 2019/0164289 | A1* | 5/2019 | Sedlmair ............ G06T 7/155 |
| 2019/0313990 | A1* | 10/2019 | Sahbaee Bagherzadeh ............ A61B 6/583 |
| 2020/0000362 | A1* | 1/2020 | Wallace ............ G06T 7/0012 |
| 2020/0160997 | A1* | 5/2020 | Bagci ............ A61B 6/037 |
| 2020/0211189 | A1* | 7/2020 | Yip ............ G06T 7/0012 |

OTHER PUBLICATIONS

Gulla Aiste et al: "Tu2039 Combining Ceus and Artificial Intelligence to Identify Early Parenchymal Changes in Acute Severe Pancreatitis", Gastroenterology, vol. 158, No. 6, May 1, 2020, pages S-1596. DOI:10.1016/S0016-5085(20)34679-5.

Kielaite-Gulla Aiste, et al: "The Concept of AI-based Algorithm: Analysis of CEUS Images and HSPs for Identification of Early Parenchymal Changes in SEvere Acute Pancreatitis", Informatica, Jan. 1, 2021, pp. 305-319. DOI:10.15388/21-INFOR453.

Saftiou Adrian, et al: ?Quantitative contrast-enhanced harmonic EUC in differential diagnosis of focal pancreatic masses (with videos), Gastrointestinal Endoscopy, Elsevier, vol. 82, No. 1., Mar. 16, 2015, pp. 59-69. DOI:10.1016/J.GIE.2014.11.040.

Omoto Shunsuke, et al.: "Characterization of Pancreatic Tumors with Quantitative Perfusion Analysis in Contrast-Enhanced Harmonic Endoscopic Ultrasonography", Oncology: International Journal of Cancer Research and Treatment, vol. 93, No. 1, Jan. 1, 2017. DOI: 10.1159/000481231.

Lin Yuan-Ping et al.: "The Application of Artificial Intelligence Technology in the Diagnosis ofAcute Pancreatitis", 2019 Prognostics and System Health Management Conference (PHM-Paris), IEEE, May 2, 2019, pp. 244-248. DOI:10.1109/PHM-PARIS.2019.00048.

* cited by examiner

SYSTEM FOR VISUAL DATA ANALYSIS OF ULTRASOUND EXAMINATIONS WITH AND WITHOUT A CONTRAST MEDIUM, FOR EARLY AUTOMATED DIAGNOSTICS OF PANCREATIC PATHOLOGIES

TECHNICAL FIELD

The invention belongs to the field of medical equipment, and specifically—data analysis of ultrasound images as well as ultrasound images using the contrast medium. This is a system and a method for the automatised early diagnostics of pancreatic pathology and pancreatic necrosis. This description presents a system and a method for the automatised early diagnostics of acute pancreatitis in humans.

STATE OF THE ART

The ultrasound examination of the pancreatic tissue and the ultrasound examination with a contrast medium is one of the most accessible, safest (not involving the ionising radiation) and cheapest imaging methods to assess the condition of pancreas as well as adjacent tissues and other abdominal organs. This method allows assessment of the changes characteristic for acute pancreatitis in the pancreas and other organs as well as pancreatitis-associated local complications. The contrast media used during the ultrasound examinations are considered the safest ones; differently from the contrast media used during CT and MRI scans, they are not associated with the nephrotoxic effect. Ultrasound examination with the contrast medium allows both qualitative and quantitative real-time assessment of tissue perfusion (dynamic examination).

Methods of automatised processing of medical image and data provide added value and information for diagnosis-related decision making.

The document of USA patent US2015/0201907 contains a description of the method indicated for automatised detection of fluid effusion in the diagnostic ultrasound images of human abdomen. Effusion of fluids occurs because of internal bleeding. The suggested method is intended for automatised detection of liver and kidney location as well as aggregates of effused fluids using the procedures for processing of digital ultrasound images.

Patent application WO2017/075509 has disclosed the application of the non-invasive diagnostics technologies based on different physical principles (including ultrasound) and the use of the classifier installed in the software for automatised detection of a breast neoplasm.

Patent EP3510917 mentions the application of artificial intelligence (machine learning) for the automatised detection of the informative area in the images of human optical coherence tomography.

The patent US2014/0185895 document describes automatised detection of the informative area contour of the abdominal tissues of the human foetus in the diagnostic ultrasound images. As well as creation of a statistical model, involving characteristic features of the ultrasound images.

The patent US2018/0276821 document discloses the automatised detection and classification of liver neoplasms in the contrast-enhanced ultrasound (CEUS) diagnostic images. An automated analysis of image informative area is carried out at time intervals and at a spatial resolution. In addition, provision of a clinical decision support functionality for diagnostics applying a classifier installed in the software.

Acute pancreatitis diagnostics algorithm and application of ultrasound technique has been described in the documents of patents RU2649528 and RU2622611.

The automated solutions for non-invasive diagnostics of human internal organs described in the above-mentioned document have certain limitations as compared with the solutions disclosed in this description:

a) the informative area of the pancreas in the ultrasound diagnostic images with and without a contrast medium is detected only applying manual approach based on radiologist's experience, automation option is not available;

b) aiming to compensate the artefacts in the images caused by the physiological movements (e.g., patient's breathing, blood vessel pulsation) and positioning of the ultrasonic transducer array (such as movement of the investigator during the recording) correction of the selected contour is made only manually based on the experience of a physician radiologist. Automation option is not available;

c) the areas of healthy (viable) pancreatic tissues and the areas of pathological tissues (such as necrosis caused by the development of acute pancreatitis or a malignant tumour) are assessed only visually. Automated assessment of spatial quantitative tissue viability estimate in the regions of viable tissues and the regions of pathological tissues is not possible.

d) automated qualitative assessment of the dynamics of pancreatic tissue perfusion applying the comparative analysis in the pancreatic volume, aorta and the superior mesenteric artery has not been carried out.

Our invention describes a system and a method for automated analysis of diagnostic images and data of human pancreas affected by acute pancreatitis obtained by the ultrasound imaging technique with and without a contrast media. As a result of ultrasound examination with and without a contrast media an added value of automated clinical decision support is obtained involving automatised quantitative assessment of the viability pancreatic tissue and dynamics of perfusion in the examined pancreatic area.

The obtained quantitative information facilitates and accelerates the final clinical diagnosis making process for the acute pancreatitis and other pathologies as well as planning of possible surgical or radiological interventions or further treatment tactics. Up to now, such functionality during the ultrasound examination with and without a contrast medium for the diagnostics of pancreatic pathology was not available.

SUMMARY OF THE INVENTION

The described system and method intended to detect the signs of pancreatic pathology and pathologically altered pancreatic tissue, and more specifically—a system and a method for the collection and automated analysis of images and data of ultrasound and contrast ultrasound examination. The system consists of diagnostic ultrasound device with a software for the visualisation and processing of the information of a contrast ultrasound examination (2), carried out using the corresponding ultrasound transducers (1). Also, a database of a hospital information system (3), containing the collected and stored digital images and data of ultrasound examinations with and without a contrast medium. A workstation of the investigating physician for ultrasound image review or a diagnostic ultrasound device (4), designed for the review and analysis of digital images and data of ultrasound examinations and contrast ultrasound examinations with installed specialised software (5) and algorithms for the analysis of ultrasound images and data of human pancreas (collected in the database of hospital's information system (3)). Also, for automated assessment of informative quantitative parameters and automated comparison (using a classifier) with the database of characteristic images and parameters (6), for the assessment of estimates of pancreatic tissue damage and early diagnosis of acute pancreatitis. Classification result: no necrosis lesions, low, moderate or high-level necrosis lesions.

A system for analysis of ultrasound examination and contrast ultrasound examination images and data ensures early automated diagnosis of acute pancreatitis and detection of non-viable pancreatic tissues applying an artificial intelligence (different neural networks—mono-layer, multiple layer, deep learning, supervised, non-supervised etc.) and the classifier algorithms installed in the specialised software (5).

THE MOST SUITABLE IMPLEMENTATION OPTIONS

Figure 1:
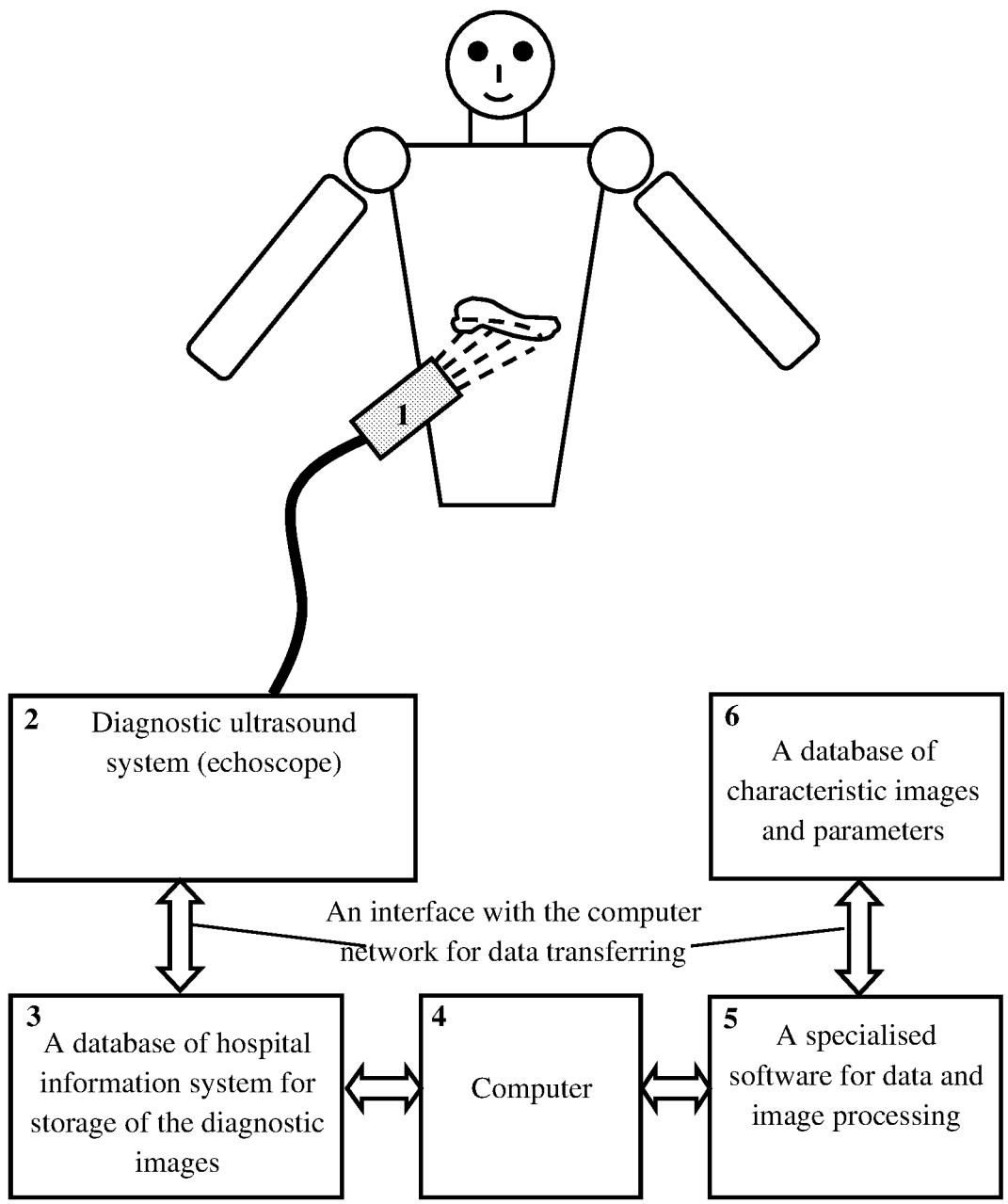
FIG. 1. A scheme of the system for analysis of images and data of ultrasound examination and contrast ultrasound examination for automated early diagnosis of acute pancreatitis and pancreatic necrosis applying an artificial intelligence (different neural networks) and the classifier algorithms, with its components.

A system for the analysis of data and images of ultrasound examinations with and without a contrast media intended for the automated acute diagnosis of acute pancreatitis and pancreatic necrosis applying the algorithms of artificial intelligence (neural networks) described in this document has been designed for physicians-radiologists and professionals of other areas involved in such examinations. The system consists of the following devices (FIG. 1)

Figure 2:
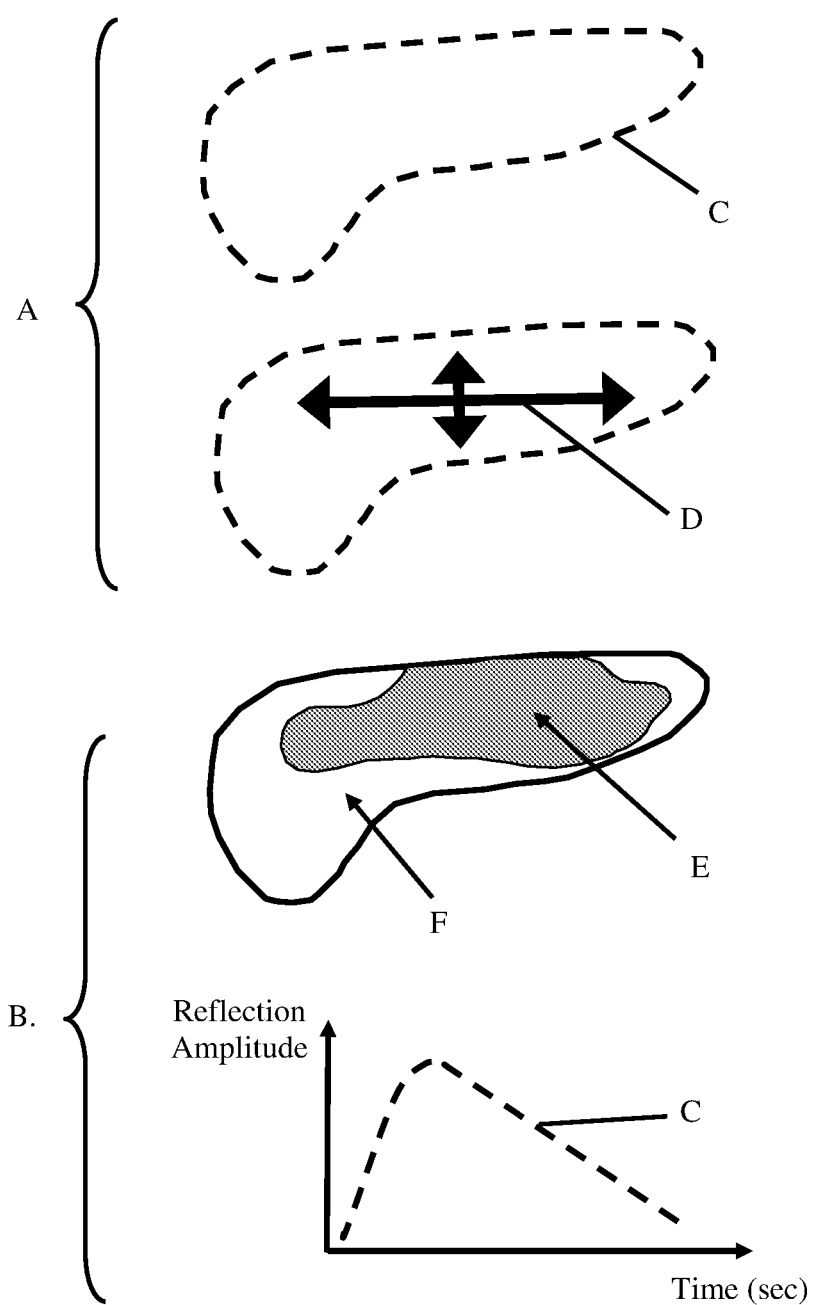
FIG. 2. A sequence of the processing steps of the images and data obtained during an ultrasound examination and a contrast ultrasound examination.

1—An array of ultrasound traducers (1);
2—Diagnostic ultrasound system with a specialised software for the examinations with a contrast medium (2);
3—A hospital information system with a database for storing of ultrasound images (3);
4—A computer intended for the review and processing of the ultrasound images (4);
5—A specialised software for the processing of ultrasound images and data with and without a contrast medium (5);
6—A database of characteristic images and parameters (6);

A non-invasive imaging of the structure of pancreatic tissues is carried out suing a diagnostic ultrasound system (2) with an array of ultrasound transducers (1). The registered and digitalised ultrasound images and data are stored in the database of hospital information system (3). A computer (4) intended for the review and analysis of the digitised ultrasound images and data. A computer (4) with installed specialised software (5) and algorithms is intended for automated analysis of ultrasound images and data of the human pancreas (collected in the database of hospital information system (3)). The algorithms for automated early diagnostics of acute pancreatitis and pancreatic necrosis that are installed in the specialised software (5) are applied in the following main stages (FIG. 2):

1. A diagnostic ultrasound system (2) with an array of ultrasound transducers (1) uploading the recorded images and data of the pancreatic ultrasound examinations with and without a contrast medium from the data base of hospital information system (3);
2. Detection of the informative area (C) in the diagnostic images (A) applying the algorithms of artificial intelligence (neural networks);
3. An automated detection and tracing of informative area in the diagnostic ultrasound images by adaptive correction of a contour of data selection area (D), aiming to eliminate the artefacts in the images caused by the physiological movements (e.g., patient's breathing, blood vessel pulsation) and positioning of the ultrasonic transducers array (such as movement by the investigating physician);
4. Establishment of spatial quantitative pancreatic tissue viability in the pancreatic volume using the ultrasound diagnostic images with a contrast medium (B). The detection and assessment is performed based on the wave reflection levels from the area of viable pancreatic tissues vs those from pathological tissue area (e.g. damaged by necrosis caused by acute pancreatitis or due to malignant neoplasm development). The adaptive thresholding algorithms are used to define the levels (Otsu et al.). The area (E) of necrosis region $S_1=X$ % and a set of quantitative parameters describing the region are calculated: $S_p=[s_1, s_2, s_3 \ldots s_N]$. The area of healthy (viable) pancreatic tissues (F) $S_2=Y$ % and a set of quantitative parameters describing the region are also calculated: $S_g=[s_1, s_2, s_3 \ldots s_N]$;
5. A quantitative determination of perfusion dynamics in the viable pancreatic tissues in the ultrasound images with a contrast medium (B) by assessing the change in time of the amplitudes of the reflected ultrasound waves (integrated in the detected area of pancreatic contour) (G), after the injection of contrast medium. A normal log-distribution or other distribution model is used for the determination of the curve of perfusion dynamics. A position of peak value, ascending and descending curve slopes, dynamics of contrast medium inflow and outflow in the informative regions as well as other parameters are analysed. After obtaining the curve of perfusion dynamics (G), a comparison with perfusion dynamic in the viable part of the pancreas (if present) and in aorta and in superior mesenteric artery is carried out. A set of quantitative parameters describing the perfusion dynamics is also defined: $P_g=[p_1, p_2, p_3 \ldots p_N]$;
6. The pancreatic ultrasound images with and without a contrast medium and the defined set of quantitative parameters ($S_1$, $S_2$, $S_p$, $S_g$ and $P_g$) are compared with the images characteristic for an acute pancreatitis and the parameters from the database (6);
7. Detection of the signs of acute pancreatitis as well as of viable and non-viable pancreatic tissues (necrosis) applying the classification algorithm installed in the specialised software (5). A database of characteristic images and parameters is used for algorithm training (6).

The invention claimed is:

1. A method of automated assessment of ultrasound images and data of a pancreatic tissue for automated diagnosis of pancreatic pathologies, the method comprising:

providing ultrasound images of a reflected ultrasound wave amplitude distribution in the pancreatic tissue in grey scale and contrast medium regimens, and in ultrasound scanning modes both without and with a contrast medium;

detecting a contour of the pancreatic region in said ultrasound images;

creating a multidimensional data module comprising said ultrasound images and the pancreas contour;

processing the multidimensional data module, using a database of characteristic pancreas ultrasound images and parameters, and applying a specialized machine learning software by:
 i. determining from the ultrasound images obtained without and with the contrast medium, within the pancreas contour; a necrotic tissue region, and a set of quantitative parameters describing said necrotic region; a viable tissue region, and a set of quantitative parameters describing said viable region,
 ii. determining, within the viable tissue region, at least one function of the contrast medium perfusion dynamics, by assessing the perfusion amplitude change-in-time after injecting the contrast medium; and a set of quantitative parameters describing said perfusion dynamics function,
 iii. comparing said at least one perfusion dynamics function with perfusion dynamics in aorta and superior mesenteric artery, and therefrom establishing more than one viability levels of the pancreatic tissue within the viable region, and associating said perfusion dynamics function with a viability level, using the database of characteristic ultrasound images and parameters; and
 iv. producing by a computer:
  at least one perfusion dynamics function curve determined from the viable tissue region, the set of parameters describing said function, and the pancreatic tissue viability level associated with said function; and/or
  an image of pancreas tissue in the contour, comprising at least a segment of the pancreas viable tissue associated with a viability level, whereas said viability level is determined from the perfusion dynamics function in that segment.

2. The method of claim 1, wherein processing of the multidimensional module further comprises automated detection of the contour of the pancreatic region in ultrasound examination images and in diagnostic contrast ultrasound examination images, applying adaptive correction of the contour of data selection region to eliminate artifacts in the images caused by physiological movements and positioning of ultrasonic transducers array during the ultrasound examination.

3. The method of claim 1, wherein a diagnostic ultrasound system is configured in a way that the ultrasound imaging window accommodates the whole patient's pancreas during the examination.

4. The method of claim 1, wherein the wave reflection levels from the viable pancreatic tissues versus the reflection levels from the pathological tissues are defined by adaptive thresholding algorithms.

5. The method of claim 1, wherein a distribution model is used for quantitative determination of the function of perfusion dynamics in the viable pancreatic tissues.

6. The method of claim 5, wherein said distribution model is a normal logarithmic distribution model.

7. The method of claim 5, wherein the quantitative determination of the function of the contrast medium perfusion dynamics comprises any one of: a position of the function peak value, ascending and descending slopes, dynamics of the contrast medium inflow and outflow in the informative regions, as well as analysis of other parameters of the perfusion dynamics.

8. The method of claim 1, wherein in step iii the pancreatic tissue viability levels within the pancreas contour associate with any one assessment of;
 no necrosis lesions,
 low necrosis lesions;
 moderate necrosis lesions,
 high-level necrosis lesions.

9. A system using the method of claim 1 for automated analysis and assessment of ultrasound images and data of a pancreatic tissue, comprising:
 a) a database of characteristic pancreas ultrasound images and data, configured for collection and storage of such images and data obtained by a diagnostic ultrasound system said ultrasound images and data produced under grey scale and contrast medium regimens;
 b) a diagnostic ultrasound system configured for emitting ultrasound waves to a patient's pancreatic region and registration of 2D images of pancreatic sections of a reflected ultrasound wave amplitude distribution in said pancreatic region under grey scale and contrast medium regimens with and without the contrast medium;
 c) a second database configured for storing the registered 2D images of pancreatic sections obtained in grey scale and contrast medium regimens in said second database,
 d) a computer with a specialized machine learning software, configured and operated by;
  determining a contour of the pancreatic region from the patient's 2D images of pancreatic sections,
  creating a multidimensional data module comprising said patient's 2D images of pancreatic sections and the pancreas contour,
  processing said multidimensional data module according to steps i-iii of claim 1; and
  presenting the patient s pancreas status estimate according to step iv of claim 1.

10. The system of claim 9, wherein
 the machine learning is implemented using any of mono-layer, multi-layer, deep learning, supervised, non-supervised neural networks; and
 the pancreatic tissue viability level association classifier is implemented by algorithms in a specialized software.

11. A Method to diagnose acute pancreatitis, the method comprising use of the system of claim 9.

* * * * *